Jan. 22, 1957  P. T. HAHN  2,778,615
BEATER WITH RESILIENTLY YIELDABLE BLADES
Filed Oct. 25, 1954
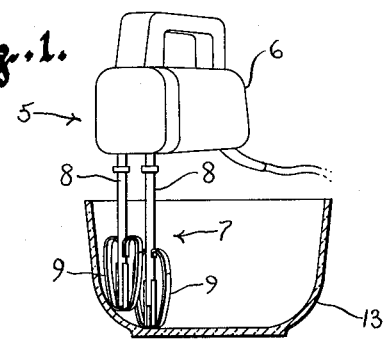
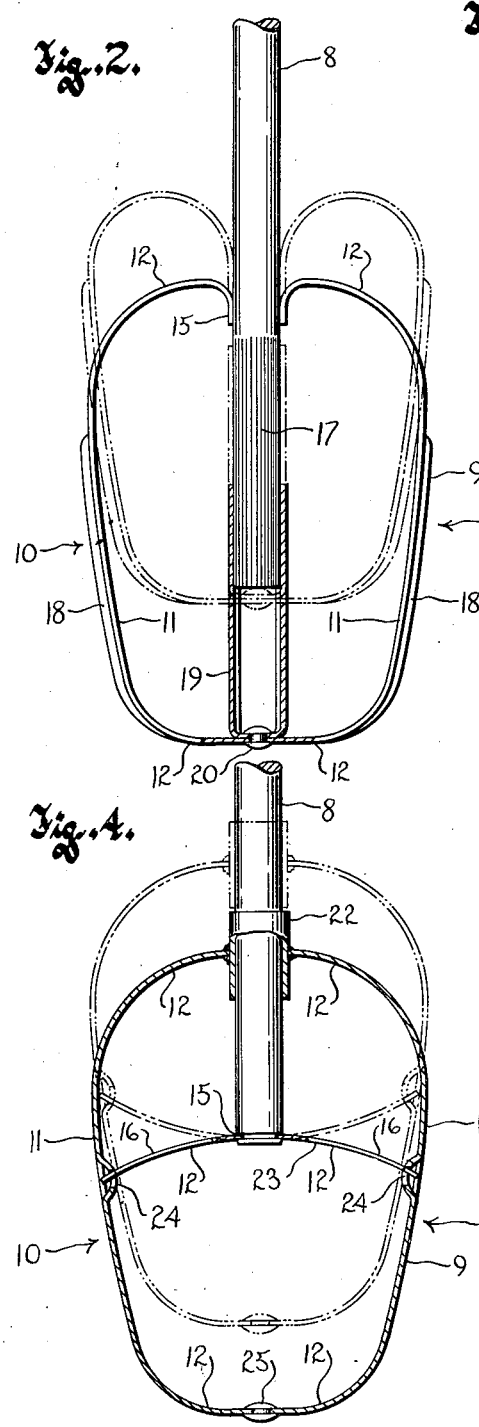
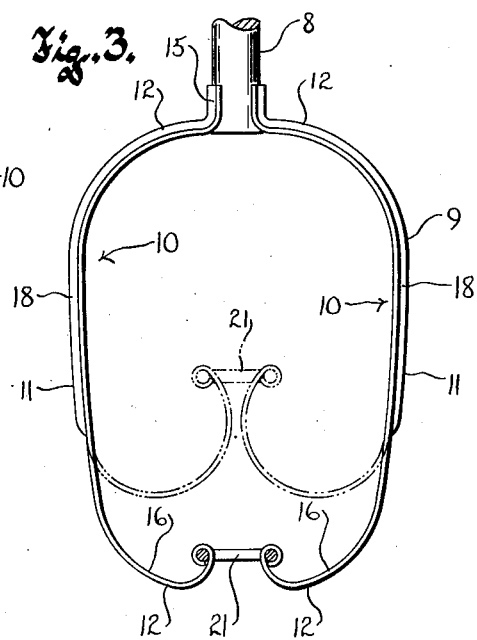
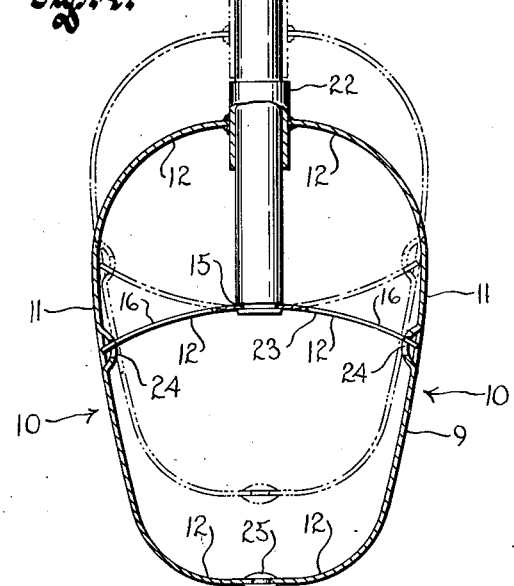
Inventor
Paul T. Hahn
By
Attorney United States Patent Office 2,778,615
Patented Jan. 22, 1957

2,778,615

BEATER WITH RESILIENTLY YIELDABLE BLADES

Paul T. Hahn, Milwaukee, Wis., assignor to John Oster Manufacturing Company, Milwaukee, Wis., a corporation of Wisconsin Application October 25, 1954, Serial No. 464,343

3 Claims. (Cl. 259—134)

This invention relates to rotary food mixers of the type used for beating and mixing foods and liquids, and refers more particularly to improvements in beaters for mixers of that type.

The primary object of the present invention is similar to that of the invention described and claimed in the copending application of Alfred W. Madl, Serial No. 366,977, filed July 9, 1953, now Patent No. 2,699,925, granted January 18, 1955, and resides in the provision of a food mixer having axially yieldable beaters, and more particularly in providing a beater having a blade portion which is capable of such axial yieldability.

In general, the purpose of providing a mixer with axially yieldable beaters is to enable the beater blades to more closely conform to the curved interior surfaces of a mixing bowl as the mixer is manually manipulated in the bowl. Axially yieldable beaters are therefore most advantageously provided on the so-called portable type of food mixers, which are held by the operator during use, as distinguished from those mixers that are normally mounted on a pedestal or the like to have their beaters operate in a fixed zone in a mixing bowl supported in a predetermined position with respect to the beater shafts.

One of the main reasons for the growing popularity of the portable type of food mixer is that it enables the operator to shift or tilt the beaters about in the mixing bowl at will, thereby enabling the beaters to be moved into all areas of the mixing bowl to facilitate the mixing operation and to dislodge food being mixed from all of the surfaces of the bowl interior. When so shifted, however, the rotating mixer blades are apt to clatter loudly when they come into engagement with the sides of the bowl, and may even become damaged. It is the object of this invention, therefore, to provide a food mixer of the character described having beaters so constructed that they can be moved about more freely in a mixing bowl, without excessive clattering when they engage the walls of the bowl.

More particularly, it is an object of this invention to reduce the tendency of the beater blades to clatter against the walls of a mixing bowl through the provision of axially yieldable beaters of simple and inexpensive design admirably suited for use on low-priced manually operated mixers as well as the electric motor driven type.

A further object of this invention is to provide a beater for a rotary food mixer of the character described wherein at least the bottom of the beater blade is axially yieldable with respect to the shaft of the beater to thereby provide for independent axial motion of the beater by taking advantage of the inherent flexibility of portions of the blade itself.

Another object of this invention resides in the provision of an axially yieldable beater for a food mixer of the character described, wherein the beater may be made interchangeable with others of the non-yieldable type, so that the benefits of independent axial beater movement may be readily obtained in mixers not originally provided with that desirable feature by simple and inexpensive replacement of the original beaters with beaters embodying the present invention.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates several complete examples of the physical embodiment of the invention constructed according to the best modes so far devised for the practical application of the principles thereof, and in which:

Figure 1 is a perspective view of a rotary food mixer equipped with the axially yieldable beaters of this invention, the mixer being depicted in use with a mixing bowl which is shown in section;

Figure 2 is a side elevational view of the lower portion of a beater embodying the principles of this invention, portions being shown in section;

Figure 3 is a side elevational view of a modified embodiment of the invention; and Figure 4 is a view similar to Figure 2 but illustrating another embodiment of the invention.

Referring now more particularly to the accompanying drawing, in which like numerals designate like parts, the numeral 5 designates generally a food mixer of the type having a driving mechanism (not shown) enclosed in a housing 6 and from which a pair of beaters 7 project downwardly, the beaters being rotatably driven by the driving mechanism in a well-known manner.

Each beater comprises generally a straight elongated rigid shaft 8 and a blade structure 9 carried by the lower end portion of the shaft. Conventionally two beaters are employed on a mixer, their shafts being parallel to one another and rotating in opposite directions.

In general, the blade structure of each beater is conventional to the extent that it comprises a plurality of circumferentially equispaced lobes 10, each consisting of an elongated side member 11 extending longitudinally of the axis of its shaft 8 in radially spaced relation thereto, and a plurality of arms 12 joined to the side member at locations spaced along its length and extending inwardly therefrom substantially radially of the shaft axis. Two diametrically opposite lobes 10 have been shown as comprising the blade structure in the drawings, although it will be appreciated that three or even four circumferentially equispaced lobes may be employed if desired.

The lobes comprise a narrow, elongated band or strip of metal curved to form substantially a ring or loop, secured to the shaft to be driven thereby with the surfaces of the blade substantially normal to the plane of its loop so that as the blade rotates in its orbit it is presented edge-wise to the material to be mixed. In the present case, however, a portion of the blade is made yieldingly flexible to permit the bottom portion of the blade to move upwardly as it engages various portions of the curved interior of a mixing bowl 13, to thereby minimize clatter which normally results from such engagement. At the same time, the blades on the beaters will be able to contact both the side and bottom of the bowl, as seen in Figure 1, to ensure thorough agitation of all material in the vessel.

In each embodiment of the invention the inner ends of the arms at one level have a driving connection 15 with the shaft whereby the blade structure is disposed with its bottom (i. e. the lowermost arms) spaced a substantial distance below the lower end of the shaft, and certain of the arms 16 are resiliently flexible to enable at least the bottom portion of the blade to be upwardly yieldable.

In the embodiment of the invention shown in Figure 2, each of the two lobes which comprise the beater blade has the inner end of its upper arm 12 welded or otherwise anchored to the lower part of the shaft and its lower arms 12 are integrally connected with one another, so that the two lobes cooperate to form a loop-like blade. The lower portion 17 of the shaft extends downwardly beyond the connection 15 with the inner ends of the upper level arms of the blade, but the shaft terminates a substantial distance above the bottom arms 12 of the blade.

The upper end portions of the lobes comprising the upper level radially extending arms 12, are resiliently flexible, but the lower portion of each lobe, comprising the lower radial arms 12 and the longitudinal side members 11 connecting the upper and lower arms, are rendered substantially rigid by a longitudinal rib or ridge 18. Hence, when upward pressure is applied to the bottom of the blade, it will move upward in response thereto, the upper resilient arms yieldingly flexing as shown in broken lines. To guide the lower portion of the blade in such yielding axial motion a substantially tubular sleeve or guide 19 is coaxially secured to the bottom of the blade and projects upwardly therefrom to have freely slidable telescoping engagement with the lower portion 17 of the shaft. If desired the sleeve may have a splined connection with the shaft. The head of the rivet 20 by which the guide is secured to the blade also serves as a button which engages the inner surface of a mixing bowl and prevents rattling engagement of the beater blades therewith.

In the embodiment of the invention illustrated in Figure 3, the lobes comprise two opposite C-shaped members, having their arms extending toward the shaft axis, and the extremities of their upper level arms 12 welded or otherwise anchored to the lower part of the shaft. The lower extremities of the C-shaped portions, comprising the lowermost radially extending arms 12, are resiliently flexible and are bowed to facilitate upward flexing of the bottom part of the blade and to provide rounded bottom portions on the blade which present a smoothly rounded surface to the interior of a mixing bowl. The upper radial arms 12 and the side members 11 are rendered substantially rigid by a longitudinal rib or ridge 18. To further promote and control flexing of the lowermost radially extending arms, their radially inner ends are connected by means of a suitable link 21, in this case shown as comprising a ring around which the inner extremities of the lower arms are curled, whereby the two lowermost arms have limited freedom for independent flexure.

In the embodiment of the invention shown in Figure 4 the blade comprises three axially spaced groups of radially extending arms 12, disposed at an upper, a lower, and an intermediate level, and the lengthwise extending side members 11 are integral with the upper and lower arms, cooperating therewith to form a loop-like blade similar to that shown in the Figure 2 embodiment of the invention. Preferably the loop-like portion of the blade is substantially rigid and the inner ends of its upper level arms 12 are connected with a sleeve 22 freely slidably embracing the lower portion of the shaft and by which the blade is guided for bodily axial motion with respect to the shaft.

The radially extending arms at the intermediate level comprise a resiliently flexible bowed strip 23 which is medially non-rotatably anchored to the lower end of the shaft and has its outer ends connected to the side members by means of tongue and slot connections 24 which permit the medial arms to flex up and down and to carry the side members—and thus the loop portion of the blade—up and down with them. The medial arms, of course, normally bias the blade downwardly to a position in which the lowermost arms 12 are spaced below the bottom of the shaft.

Preferably a coaxial button 25 of plastic or the like is secured to the bottom of the blade to engage the bottom of a mixing bowl and thus smoothly effect axial displacement of the blade.

From the foregoing description taken together with the accompanying drawing it will be readily apparent that this invention provides axially yieldable beaters for a rotary food mixer which are inexpensive to manufacture and which, since yieldability is confined to the blades of the beaters, may be readily made interchangeable with beaters of the non-yieldable type.

What I claim as my invention is:

1. A beater for a food mixer comprising: a shaft; a plurality of substantially C-shaped blade elements carried by the shaft, the upper and lower arms of each of said elements extending toward the shaft axis, the lower arms being disposed beneath the end of the shaft and connected together; a sleeve slidably mounted on the shaft, and to which the upper arms are secured; a downwardly bowed spring blade medially fixed to the lower end portion of the shaft with the extremities of said blade adjacent to the medial portions of the C-shaped blade elements; and means connecting the extremities of said spring blade to the blade elements so that the spring blade when in its normal free state yieldingly maintains the blade elements in a predetermined position with respect to the shaft from which they are displaceable upwardly against the resiliency of the spring blade.

2. A beater for a food mixer, comprising: an elongated rigid shaft; and a blade structure on the lower end portion of the shaft comprising a plurality of elongated side members extending lengthwise of the shaft axis and spaced therefrom, and arms joined to each side member at three longitudinally spaced locations thereon, said arms extending substantially radially inwardly from the side members toward the shaft axis and corresponding arms being at the same level and having their inner ends adjacent to one another, the upper arms being axially slidably connected with the shaft and the inner end portions of the arms at one level having a rotation transmitting connection with the shaft, said connections holding the arms at the lowermost level spaced beneath the bottom of the shaft, and the arms at the intermediate level being resiliently flexible to permit displacement of the lowermost arms of the side members upwardly relative to the shaft.

3. The beater of claim 2 wherein the inner ends of the intermediate arms are drivingly connected with the shaft.

References Cited in the file of this patent

UNITED STATES PATENTS 2,538,877    McCloy _____ Jan. 23, 1951